United States Patent
Yamada et al.

(10) Patent No.: US 10,975,106 B2
(45) Date of Patent: Apr. 13, 2021

(54) ORGANIC SILICON COMPOUND, METHOD FOR PRODUCING THE SAME, AND CURABLE COMPOSITION

(71) Applicant: Shin-Etsu Chemical Co., Ltd., Tokyo (JP)

(72) Inventors: Tetsuro Yamada, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/783,693

(22) Filed: Feb. 6, 2020

(65) Prior Publication Data

US 2020/0270285 A1  Aug. 27, 2020

(30) Foreign Application Priority Data

Feb. 25, 2019  (JP) .............................. JP2019-031644

(51) Int. Cl.
| | |
|---|---|
| C07F 7/02 | (2006.01) |
| C09K 8/52 | (2006.01) |
| C07F 7/18 | (2006.01) |
| C09D 7/48 | (2018.01) |
| C08G 77/388 | (2006.01) |
| C09J 11/06 | (2006.01) |
| C09J 11/08 | (2006.01) |
| C08K 5/5419 | (2006.01) |

(52) U.S. Cl.
CPC .......... *C07F 7/1804* (2013.01); *C07F 7/1876* (2013.01); *C08G 77/388* (2013.01); *C09D 7/48* (2018.01); *C09J 11/06* (2013.01); *C09J 11/08* (2013.01); *C08K 5/5419* (2013.01)

(58) Field of Classification Search
CPC .................................... C07F 7/02; C09K 8/52
USPC ................. 546/14; 252/389.3, 381
See application file for complete search history.

(56) References Cited

U.S. PATENT DOCUMENTS

| | | | |
|---|---|---|---|
| 4,946,880 A | 8/1990 | Costanzi et al. | |
| 5,158,998 A | 10/1992 | Neri et al. | |

FOREIGN PATENT DOCUMENTS

| | | |
|---|---|---|
| FR | 2 800 086 A1 | 4/2001 |
| JP | 2961541 B2 | 10/1999 |
| JP | 2000-336118 A | 12/2000 |
| JP | 2005-112809 A | 4/2005 |

OTHER PUBLICATIONS

European Search Report for Appl. No. 20156477.0 dated Jul. 10, 2020.

*Primary Examiner* — Charanjit Aulakh
(74) *Attorney, Agent, or Firm* — Birch, Stewart, Kolasch & Birch, LLP

(57) ABSTRACT

To provide an organic silicon compound having an average structural formula (1).

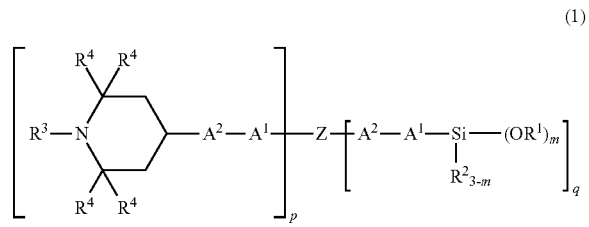

(Z represents a 2 to 20-valent group containing an organosiloxane structure, each $R^1$ independently represents an alkyl group or an aryl group, each $R^2$ independently represents an alkyl group or an aryl group, each $R^3$ independently represents a hydrogen atom, an alkyl group, an alkoxy group, or an O. (oxy radical), each $R^4$ independently represents a hydrogen atom or an alkyl group, each $A^1$ independently represents a single bond or an alkylene group free of a hetero atom, each $A^2$ independently represents a single bond or a divalent linking group containing a hetero atom, m is a number of 1 to 3, p is a number of 1 to 10, q is a number of 1 to 10, and p+q represents a number satisfying from 2 to 20 corresponding to the valency number of Z.)

12 Claims, No Drawings

ORGANIC SILICON COMPOUND, METHOD FOR PRODUCING THE SAME, AND CURABLE COMPOSITION

CROSS-REFERENCE TO RELATED APPLICATION

This non-provisional application claims priority under 35 U.S.C. § 119(a) on Patent Application No. 2019-031644 filed in Japan on Feb. 25, 2019, the entire contents of which are hereby incorporated by reference.

TECHNICAL FIELD

The present invention relates to an organic silicon compound, a method for producing the organic silicon compound, and a curable composition, and in more detail, relates to an organic silicon compound having an organosiloxane structure, a hydrolyzable group, and a hindered amine skeleton, in the molecule, and a method for producing the organic silicon compound, and a curable composition containing the organic silicon compound.

BACKGROUND ART

A silane coupling agent is a compound that has in one molecule a part having reactivity to an inorganic substance (a hydrolyzable group bonded to a Si atom) and a part capable of performing the impartment of various functions such as reactivity to an organic substance, solubility, and weather resistance, and acts as an adhesive auxiliary at the interface between an inorganic substance and an organic substance, or a resin modifier for an inorganic-organic composite material, and therefore, the silane coupling agent is widely used as a composite resin modifier.

On the other hand, a resin material has a problem of the time degradation due to action of light such as ultraviolet rays. Such a time degradation appears as deterioration of physical properties of the resin and of appearance, for example, as a phenomenon such as deterioration in flexibility or an appearance defect (cracking, yellowing, or whitening of the cured product).

As a countermeasure against the above time degradation, it has been studied that together with an ultraviolet absorbing agent such as benzotriazole or benzophenone, a stabilizer such as a nickel complex, and an antioxidant such as a hindered phenol-based antioxidant, in particular, 2,6-bis(tert-butyl)-hydroxytoluene, a hindered amine-based light stabilizer that is known to exert an excellent effect in the impartment of light stabilization, particularly of weather resistance is mixed with a resin material.

This hindered amine-based light stabilizer (HALS) suppresses the time degradation due to action of light such as ultraviolet rays on a resin, in particular, an organic resin, and has been widely used as a resin modifier capable of imparting weather resistance or light resistance to an organic resin. As the HALS, various compounds containing mainly a 2,2,6,6-tetramethylpiperidinyl group, or a 1,2,2,6,6-pentamethylpiperidinyl group have been proposed, and such a study has been conventionally conducted.

However, in recent years, the weather resistance properties required for a resin material have become stricter, and there becomes a problem that the stabilization effect is not sufficiently maintained due to the surface contamination of a resin material by volatilization or bleed-bloom phenomenon of a hindered amine-based light stabilizer during long-term use, or due to the falling of a light stabilizer added along with the surface contamination.

In order to solve the problem as described above, Patent Document 1 has disclosed a method for binding a hindered amine-based light stabilizer directly to a resin material or a polymer compound, and Patent Document 2 has disclosed a method for increasing the molecular weight by binding multiple hindered amine-based light stabilizers in one molecule.

However, it cannot be still said that the weather resistance of these hindered amine-based light stabilizers is sufficient, and further improvement has been desired.

On the other hand, in Patent Document 3, in order to improve the weather resistance of a hindered amine-based light stabilizer, a hindered amine-based light stabilizer in which a hydrolyzable silyl group is introduced to a hindered amine-based light stabilizer, and a silicone polymer in which a hindered amino group is contained, have been disclosed.

The hydrolyzable silyl group-introduced hindered amine-based light stabilizer of Patent Document 3 reacts and integrates with a resin, and therefore, can suppress the bleed-bloom phenomenon of the light stabilizer as compared with an existing hindered amine-based light stabilizer, however since the compatibility with a resin material is extremely high, it has been difficult to suppress the ultraviolet degradation on a surface of a resin material.

Further, in the silicone polymer in which a hindered amino group is contained, due to the production method, an alkoxysilyl group having the highest reactivity with a resin material is preferentially consumed in dealcoholization condensation reaction, and therefore, there has been a problem that the ability to fix to a resin material is low, and the bleed-bloom phenomenon is easily generated.

CITATION LIST

Patent Document 1: JP-A 2000-336118
Patent Document 2: JP-A 2005-112809
Patent Document 3: JP 2961541

SUMMARY OF THE INVENTION

The present invention has been made in view of such circumstances, and an object of the present invention is to provide an organic silicon compound that is effective as a hindered amine-based light stabilizer or the like to be added to a resin, particularly a silicone-based resin, and a method for producing the organic silicon compound, and a curable composition containing the organic silicon compound.

As a result of the intensive studies to solve the problems described above, the present inventors have found a predetermined organic silicon compound having an organosiloxane structure, a hydrolyzable group, and a hindered amine skeleton, in the molecule, and a method for producing the organic silicon compound, further have found that a composition containing the organic silicon compound as a light stabilizer suppresses the time degradation due to action of light such as ultraviolet rays, and gives a cured product capable of exerting favorable weather resistance, crack resistance, and bleed resistance, and therefore, the composition is suitable for a curable composition having high weather resistance, and thus have completed the present invention.

That is, the present invention is to provide:
1. An organic silicon compound having an average structural formula (1),

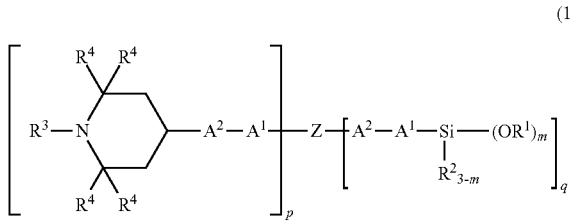

wherein Z represents a 2 to 20-valent group containing an organosiloxane structure, each $R^1$ independently represents an unsubstituted or substituted alkyl group having 1 to 10 carbon atoms, or an unsubstituted or substituted aryl group having 6 to 10 carbon atoms, each $R^2$ independently represents an unsubstituted or substituted alkyl group having 1 to 10 carbon atoms, or an unsubstituted or substituted aryl group having 6 to 10 carbon atoms, each $R^3$ independently represents a hydrogen atom, an unsubstituted or substituted alkyl group having 1 to 20 carbon atoms, an unsubstituted or substituted alkoxy group having 1 to 20 carbon atoms, or an O. (oxy radical), each $R^4$ independently represents a hydrogen atom, or an unsubstituted or substituted alkyl group having 1 to 10 carbon atoms, each $A^1$ independently represents a single bond, or an unsubstituted or substituted alkylene group having 1 to 20 carbon atoms, which is free of a hetero atom, each $A^2$ independently represents a single bond, or a divalent linking group containing a hetero atom, m is a number of 1 to 3, p is a number of 1 to 10, q is a number of 1 to 10, and p+q satisfies a number of 2 to 20 corresponding to the valency number of Z;

2. The organic silicon compound described in 1, having an average structural formula (2),

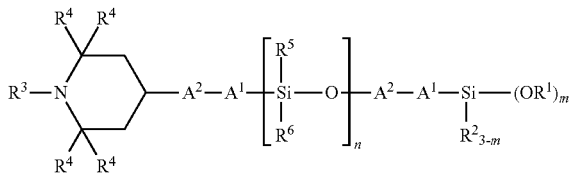

wherein $R^1$ to $R^4$, $A^1$, $A^2$, and m have the same meanings as those described above, $R^5$ and $R^6$ each independently represent an unsubstituted or substituted alkyl group having 1 to 20 carbon atoms, or an aryl group having 6 to 10 carbon atoms, n represents a number of 1 or more;

3. The organic silicon compound described in 1 or 2, having a structural formula (3),

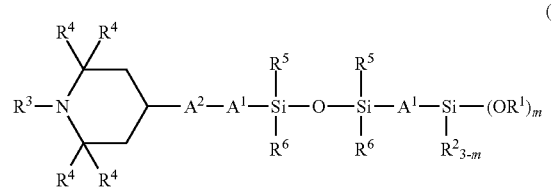

wherein $R^1$ to $R^6$, $A^1$, $A^2$, and m have the same meanings as those described above;

4. The organic silicon compound described in 1 or 2, having an average structural formula (4),

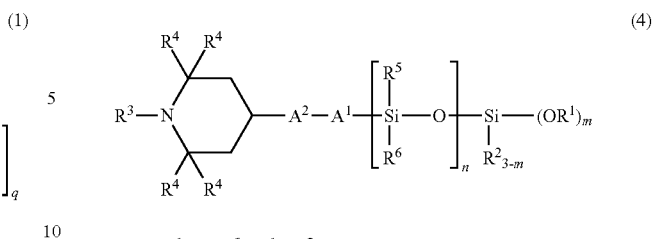

wherein $R^1$ to $R^6$, $A^1$, $A^2$, m, and n have the same meanings as those described above;

5. A method for producing the organic silicon compound described in any one of 1 to 4, including
performing hydrosilylation reaction of an amine compound having an alkenyl group of a structural formula (5)

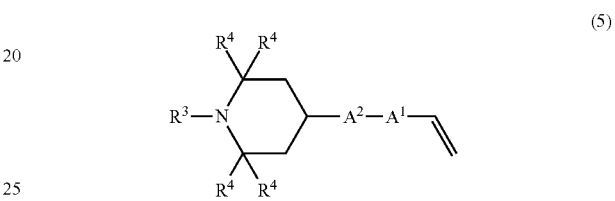

wherein $R^3$, $R^4$, $A^1$, and $A^2$ have the same meanings as those described above,
with a silane compound having an organosiloxane structure of an average structural formula (6)

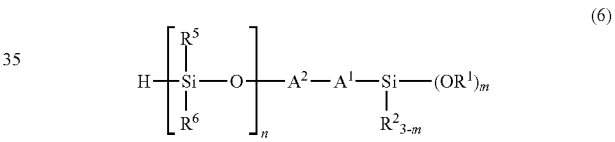

wherein $R^1$, $R^2$, $R^5$, $R^6$, $A^1$, $A^2$, m, and n have the same meanings as those described above, in the presence of a platinum compound-containing catalyst;

6. A light stabilizer, including the organic silicon compound described in any one of 1 to 4;

7. A curable composition, including the organic silicon compound described in any one of 1 to 4;

8. A coating agent, including the curable composition described in 7;

9. An adhesive agent, including the curable composition described in 7;

10. A cured article obtained by curing the curable composition described in 7;

11. A cured article, including a coating layer obtained by curing the coating agent described in 8; and 12. A cured article, including an adhesive layer obtained by curing the adhesive agent described in 9.

ADVANTAGEOUS EFFECTS OF THE INVENTION

The organic silicon compound according to the present invention has an organosiloxane structure, a hydrolyzable group having high reactivity, and a hindered amine skeleton, in the molecule, and has characteristics of being excellent in the weather resistance, the crack resistance, and the bleed resistance, as compared with a conventional hindered amine-based light stabilizer.

A composition containing the organic silicon compound according to the present invention having such characteristics can be suitably used as a curable composition, particularly, a curable composition having high weather resistance.

DESCRIPTION OF THE PREFERRED EMBODIMENT

Hereinafter, the present invention is specifically described.

The organic silicon compound according to the present invention has an average structural formula (1).

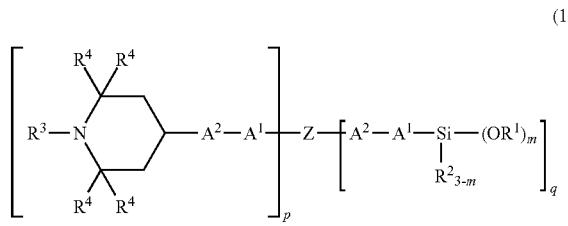

(1)

In the formula, $R^1$ and $R^2$ each independently represent an unsubstituted or substituted alkyl group having 1 to 10 carbon atoms, or an unsubstituted or substituted aryl group having 6 to 10 carbon atoms.

$R^1$ and $R^2$ each preferably represent an alkyl group having 1 to 3 carbon atoms from the viewpoints of the weather resistance, the crack resistance, and the bleed resistance.

The alkyl group having 1 to 10 carbon atoms may be any one of a linear, a cyclic, or a branched alkyl group, and preferably a linear alkyl group.

Specific examples of the alkyl group having 1 to 10 carbon atoms include a methyl, ethyl, n-propyl, n-butyl, n-pentyl, n-hexyl, n-heptyl, n-octyl, n-nonyl, and n-decyl group, and among them, a methyl, n-propyl, n-hexyl, and n-octyl group are preferred, and a methyl group is more preferred.

Specific examples of the aryl group having 6 to 10 carbon atoms include a phenyl, and naphthyl group, and a phenyl group is preferred.

Each $R^3$ independently represents a hydrogen atom, an unsubstituted or substituted alkyl group having 1 to 20 carbon atoms, an unsubstituted or substituted alkoxy group having 1 to 20 carbon atoms, or an O. (oxy radical).

$R^3$ preferably represents a hydrogen atom, an alkyl group having 1 to 3 carbon atoms from the viewpoints of the weather resistance, the crack resistance, and the bleed resistance. The alkyl group having 1 to 20 carbon atoms may be any one of a linear, a cyclic, or a branched alkyl group, and preferably a linear alkyl group.

Specific examples of the alkyl group having 1 to 20 carbon atoms include a methyl, ethyl, n-propyl, n-butyl, n-pentyl, n-hexyl, n-heptyl, n-octyl, n-nonyl, n-decyl, undecyl, dodecyl, and icosyl group, and among them, a methyl group, and an n-propyl group is preferred, and a methyl group is more preferred.

In the alkoxy group having 1 to 20 carbon atoms, an alkyl group in the alkoxy group may be any one of a linear, a cyclic, or a branched alkyl group.

Specific examples of the alkoxy group having 1 to 20 carbon atoms include a methoxy, ethoxy, n-propoxy, n-butoxy, n-pentoxy, n-hexoxy, n-heptoxy, n-octoxy, n-nonyloxy, n-decyloxy, undecyloxy, dodecyloxy, and icosyloxy group, and among them, a methoxy group, and an ethoxy group are preferred, and a methoxy group is more preferred.

Each $R^4$ independently represents a hydrogen atom or an unsubstituted or substituted alkyl group having 1 to 10 carbon atoms. Examples of the alkyl group include the same groups as those described for the above $R^1$, and among them, a methyl, n-propyl, n-hexyl, and n-octyl group are preferred, and a methyl group is more preferred.

In this regard, some or all of the hydrogen atoms in an alkyl group, an aryl group, or an alkoxy group in these $R^1$ to $R^4$ may be substituted by an alkyl group having 1 to 10 carbon atoms, a halogen atom such as F, Cl, or Br, a cyano group, or the like. Specific examples of such a group include a 3-chloropropyl, 3,3,3-trifluoropropyl, 2-cyanoethyl, tolyl, and xylyl group, and from the viewpoints of the weather resistance, the crack resistance, and the bleed resistance, a 3,3,3-trifluoropropyl group is preferred.

Each $A^1$ independently represents a single bond, or an unsubstituted or substituted alkylene group having 1 to 20 carbon atoms, which is free of a hetero atom.

The alkylene group having 1 to 20 carbon atoms, which is free of a hetero atom, of $A^1$ may be any one of a linear, a cyclic, or a branched alkylene group. Specific examples of the alkylene group include an alkylene group such as a methylene, ethylene, trimethylene, propylene, isopropylene, tetramethylene, isobutylene, pentamethylene, hexamethylene, heptamethylene, octamethylene, nonamethylene, decamethylene, undecamethylene, dodecamethylene, tridecamethylene, tetradecamethylene, pentadecamethylene, hexadecamethylene, heptadecamethylene, octadecamethylene, nonadecamethylene, and eicosadecylene group; and a cycloalkylene group such as a cyclopentylene and cyclohexylene group.

Among them, $A^1$ is preferably a single bond, an ethylene group, a trimethylene group, and an octamethylene group, and more preferably a single bond, an ethylene group, and a trimethylene group.

In this regard, some or all of the hydrogen atoms in the alkylene group of $A^1$ may be substituted by an aryl group having 6 to 20 carbon atoms such as a phenyl group, and the like.

Each $A^2$ independently represents a single bond, or a divalent linking group containing a hetero atom.

Specific examples of the divalent linking group containing a hetero atom of $A^2$ include an ether bond (—O—), a thioether bond (—S—), an amino bond (—NH—), a sulfonyl bond (—S(=O)$_2$—), a phosphinyl bond (—P(=O)OH—), an oxo bond (—C(=O)—), a thiooxo bond (—C(=S)—), an ester bond (—C(=O)O—), a thioester bond (—C(=O)S—), a thionoester bond (—C(=S)O—), a dithioester bond (—C(=S)S—), a carbonic acid ester bond (—OC(=O)O—), a thiocarbonic acid ester bond (—C(=S)O—), an amide bond (—C(=O)NH—), a thioamide bond (—C(=S)NH—), a urethane bond (—OC(=O)NH—), a thiourethane bond (—SC(=O)NH—), a thionourethane bond (—OC(=S)NH—), a dithiourethane bond (—SC(=S)NH—), a urea bond (—NHC(=O)NH—), a thiourea bond (—NHC(=S)NH—), and a silicon bond (—SiR$^5$R$^6$—, in which $R^5$ and $R^6$ have the same meanings as those in $R^5$ and $R^6$ described later).

Among them, $A^2$ is preferably a single bond, an ether bond (—O—), or a silicon bond (—SiR$^5$R$^6$—).

In this regard, in a group formed of $A^1$, $A^2$ and Z, a combination in which oxygen atoms form a structure "—O—O—" of continuous oxygen atoms, or a combination in which silicon atoms form a structure "—Si—Si—" of continuous silicon atoms, is not taken.

m is a number of 1 to 3, and from the viewpoint of the bleed resistance, m is preferably a number of 2 to 3, and more preferably 3.

p is a number of 1 to 10, q is a number of 1 to 10, and p+q represents a number satisfying from 2 to 20 corresponding to the valency number of Z.

From the viewpoints of the weather resistance, the crack resistance, and the bleed resistance, p is preferably a number of 1 to 5, more preferably a number of 1 to 2, and furthermore preferably a number of 1.

From the viewpoints of the weather resistance, the crack resistance, and the bleed resistance, q is preferably a number of 1 to 5, more preferably a number of 1 to 2, and furthermore preferably a number of 1.

Accordingly, from the viewpoints of the weather resistance, the crack resistance, and the bleed resistance, p+q is preferably a number of 2 to 10, more preferably a number of 2 to 4, and furthermore preferably a number of 2.

Z represents a 2 to 20-valent group containing an organosiloxane structure, preferably a 2 to 10-valent group containing an organosiloxane structure, more preferably a 2 to 4-valent group containing an organosiloxane structure, and furthermore preferably a divalent group containing an organosiloxane structure.

Z is not particularly limited as long as it is a group containing an organosiloxane structure, and in which a linear structure, a branched structure, or a crosslinking structure may be included.

More specifically, as the organosiloxane structure, an organo(poly)siloxane structure including a D unit ($R^1_2SiO_{2/2}$ unit), a T unit ($R^1SiO_{3/2}$ unit), and/or a Q unit ($SiO_{4/2}$ unit) can be mentioned ($R^1$ has the same meaning as that described above).

Each of these units may be a single unit (D unit only, T unit only, or Q unit only), or a combination of multiple units.

In particular, from the viewpoints of the weather resistance, the crack resistance, and the bleed resistance, Z is preferably a group that has an organopolysiloxane structure containing a D unit, and more preferably a divalent group that has an organopolysiloxane structure containing a D unit alone.

Therefore, as the organic silicon compound according to the present invention, an organic silicon compound having an average structural formula of the following formula (2) is preferred, and by using such a compound, more favorable weather resistance, crack resistance, and bleed resistance are exerted.

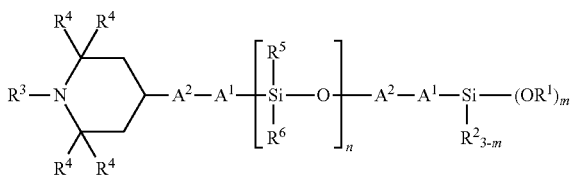

(2)

(in the formula, $R^1$ to $R^4$, $A^1$, $A^2$, and m have the same meanings as those described above.)

In the formula (2), $R^5$ and $R^6$ each independently represent an unsubstituted or substituted alkyl group having 1 to 20 carbon atoms, or an aryl group having 6 to 10 carbon atoms, and as these alkyl group and aryl group, the same groups as those described for the above $R^3$ and $R^1$ can be mentioned.

In particular, from the viewpoints of the weather resistance, the crack resistance, and the bleed resistance, $R^5$ and $R^6$ are each preferably an alkyl group having 1 to 3 carbon atoms, and more preferably a methyl group.

Further, n represents a number of 1 or more, and from the viewpoints of the weather resistance, the crack resistance, and the bleed resistance, n is preferably a number of 1 to 1,000, more preferably a number of 1 to 100, furthermore preferably a number of 1 to 50, and still more preferably a number of 1 to 10.

A weight average molecular weight of the organic silicon compound according to the present invention is not particularly limited, however, in view of the impartment of sufficient weather resistance, crack resistance, and bleed resistance to a cured product obtained by curing a curable composition containing the compound, the weight average molecular weight is preferably 400 to 100,000, more preferably 400 to 10,000, furthermore preferably 400 to 5,000, and still more preferably 400 to 1,000. In this regard, the value of the weight average molecular weight in the present invention is a value in terms of polystyrene by gel permeation chromatography (GPC).

In particular, as the organic silicon compound according to the present invention, a compound having the following structural formula (3) or (4) is preferred, and by using such an organic silicon compound, the weather resistance, the crack resistance, and the bleed resistance become more favorable.

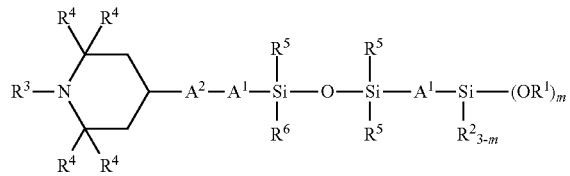

(3)

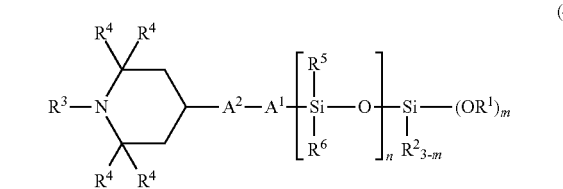

(4)

(in the formula, $R^1$ to $R^6$, $A^1$, $A^2$, m, and n have the same meanings as those described above.)

An organic silicon compound having the formula (1) of the present invention can be produced by a conventionally known technique.

For example, an organic silicon compound having the above formula (2) can be obtained by reacting an amine compound having an alkenyl group of the following structural formula (5) with a silane compound having an organosiloxane structure of the following average structural formula (6).

More specifically, an alkenyl group of an amine compound (5) having the alkenyl group, and a hydrosilyl group (Si—H group) of a silane compound (6) having an organosiloxane structure are subjected to hydrosilylation reaction in the presence of a platinum compound-containing catalyst to add the hydrosilyl group to the alkenyl group, and thus a carbon-silicon bond is formed.

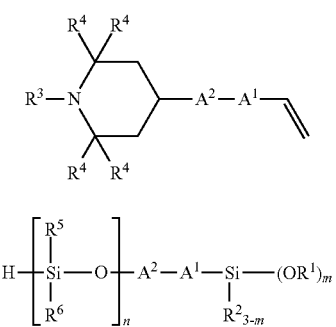
(in the formula, $R^1$ to $R^6$, $A^1$, $A^2$, m, and n have the same meanings as those described above.)
Specific examples of the amine compound having an alkenyl group of the above formula (5) include compounds having the following structural formulas, however, the amine compound is not limited thereto.
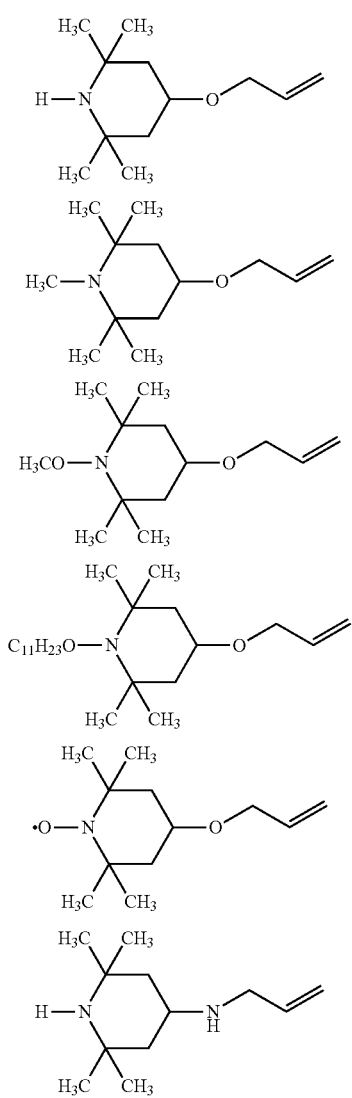
-continued
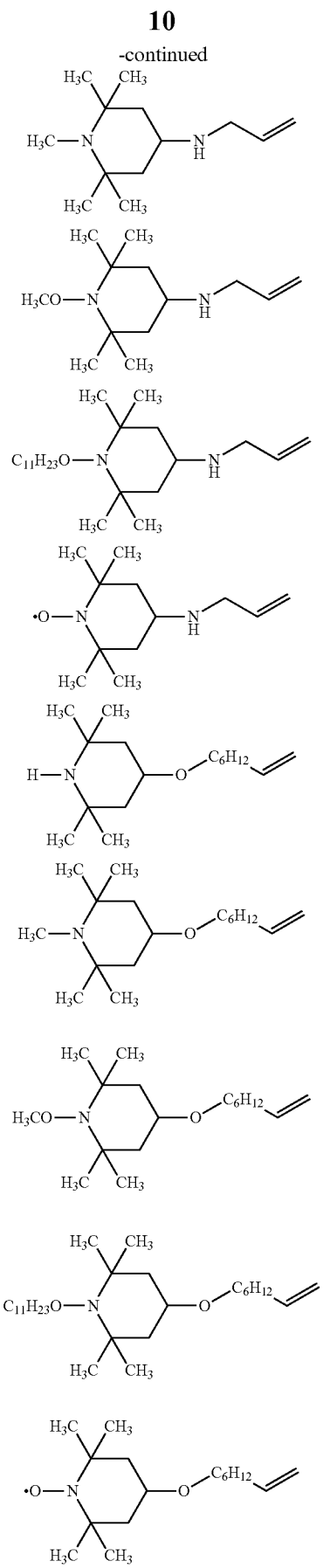

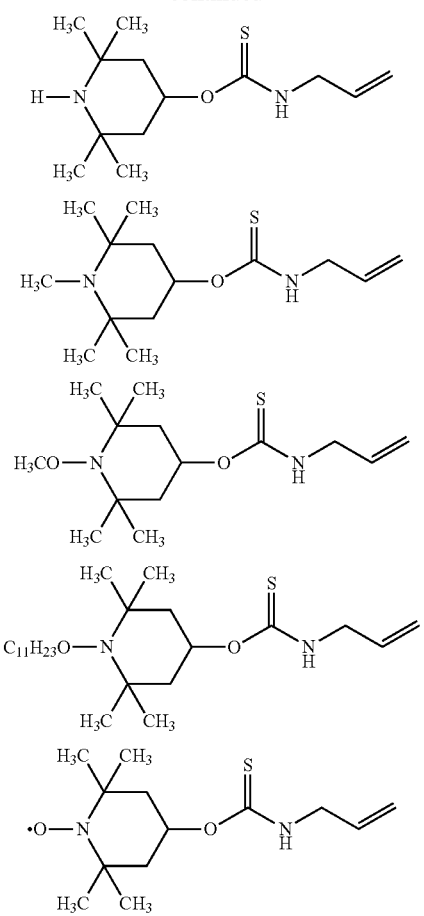

Specific examples of the silane compound having an organosiloxane structure of the above formula (6) include compounds having the following structural formulas, however, the silane compound is not limited thereto. In this regard, the number of repetitions of siloxane units in parentheses represents a number on average, and in a case of being formed of multiple different kinds of siloxane units, the arrangement order of the siloxane units in parentheses is arbitrary.

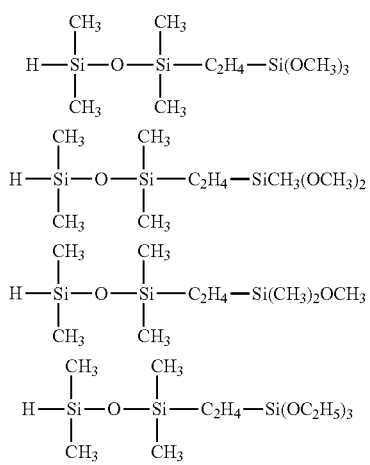

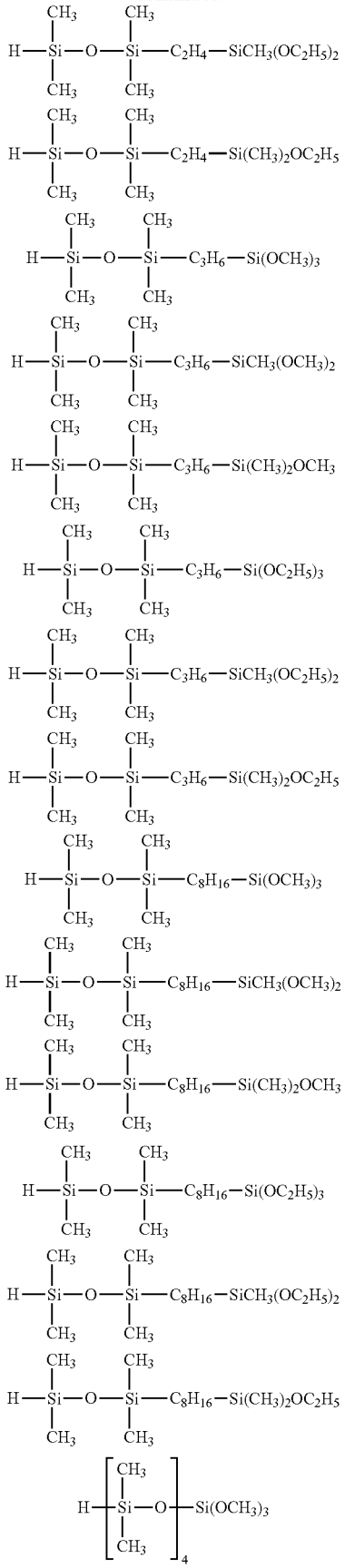

$$H-\left[\underset{\underset{CH_3}{|}}{\overset{\overset{CH_3}{|}}{Si}}-O\right]_4-SiCH_3(OCH_3)_2$$

$$H-\left[\underset{\underset{CH_3}{|}}{\overset{\overset{CH_3}{|}}{Si}}-O\right]_4-Si(CH_3)_2OCH_3$$

$$H-\left[\underset{\underset{CH_3}{|}}{\overset{\overset{CH_3}{|}}{Si}}-O\right]_4-Si(OC_2H_5)_3$$

$$H-\left[\underset{\underset{CH_3}{|}}{\overset{\overset{CH_3}{|}}{Si}}-O\right]_4-SiCH_3(OC_2H_5)_2$$

$$H-\left[\underset{\underset{CH_3}{|}}{\overset{\overset{CH_3}{|}}{Si}}-O\right]_4-Si(CH_3)_2OC_2H_5$$

$$H-\left[\underset{\underset{CH_3}{|}}{\overset{\overset{CH_3}{|}}{Si}}-O\right]_7-Si(OCH_3)_3$$

$$H-\left[\underset{\underset{CH_3}{|}}{\overset{\overset{CH_3}{|}}{Si}}-O\right]_7-SiCH_3(OCH_3)_2$$

$$H-\left[\underset{\underset{CH_3}{|}}{\overset{\overset{CH_3}{|}}{Si}}-O\right]_7-Si(CH_3)_2OCH_3$$

$$H-\left[\underset{\underset{CH_3}{|}}{\overset{\overset{CH_3}{|}}{Si}}-O\right]_7-Si(OC_2H_5)_3$$

$$H-\left[\underset{\underset{CH_3}{|}}{\overset{\overset{CH_3}{|}}{Si}}-O\right]_7-SiCH_3(OC_2H_5)_2$$

$$H-\left[\underset{\underset{CH_3}{|}}{\overset{\overset{CH_3}{|}}{Si}}-O\right]_7-Si(CH_3)_2OC_2H_5$$

$$H-\left[\underset{\underset{CH_3}{|}}{\overset{\overset{CH_3}{|}}{Si}}-O\right]_{10}-Si(OCH_3)_3$$

$$H-\left[\underset{\underset{CH_3}{|}}{\overset{\overset{CH_3}{|}}{Si}}-O\right]_{10}-SiCH_3(OCH_3)_2$$

$$H-\left[\underset{\underset{CH_3}{|}}{\overset{\overset{CH_3}{|}}{Si}}-O\right]_{10}-Si(CH_3)_2OCH_3$$

$$H-\left[\underset{\underset{CH_3}{|}}{\overset{\overset{CH_3}{|}}{Si}}-O\right]_{10}-Si(OC_2H_5)_3$$

$$H-\left[\underset{\underset{CH_3}{|}}{\overset{\overset{CH_3}{|}}{Si}}-O\right]_{10}-SiCH_3(OC_2H_5)_2$$

$$H-\left[\underset{\underset{CH_3}{|}}{\overset{\overset{CH_3}{|}}{Si}}-O\right]_{10}-Si(CH_3)_2OC_2H_5$$

$$H-\left[\underset{\underset{CH_3}{|}}{\overset{\overset{CH_3}{|}}{Si}}-O\right]_{13}-Si(OCH_3)_3$$

$$H-\left[\underset{\underset{CH_3}{|}}{\overset{\overset{CH_3}{|}}{Si}}-O\right]_{13}-SiCH_3(OCH_3)_2$$

$$H-\left[\underset{\underset{CH_3}{|}}{\overset{\overset{CH_3}{|}}{Si}}-O\right]_{13}-Si(CH_3)_2OCH_3$$

$$H-\left[\underset{\underset{CH_3}{|}}{\overset{\overset{CH_3}{|}}{Si}}-O\right]_{13}-Si(OC_2H_5)_3$$

$$H-\left[\underset{\underset{CH_3}{|}}{\overset{\overset{CH_3}{|}}{Si}}-O\right]_{13}-SiCH_3(OC_2H_5)_2$$

$$H-\left[\underset{\underset{CH_3}{|}}{\overset{\overset{CH_3}{|}}{Si}}-O\right]_{13}-Si(CH_3)_2OC_2H_5$$

$$H-\left[\underset{\underset{CH_3}{|}}{\overset{\overset{CH_3}{|}}{Si}}-O\right]_{16}-Si(OCH_3)_3$$

$$H-\left[\underset{\underset{CH_3}{|}}{\overset{\overset{CH_3}{|}}{Si}}-O\right]_{16}-SiCH_3(OCH_3)_2$$

$$H-\left[\underset{\underset{CH_3}{|}}{\overset{\overset{CH_3}{|}}{Si}}-O\right]_{16}-Si(CH_3)_2OCH_3$$

-continued $$H-\left[\underset{\underset{CH_3}{|}}{\overset{\overset{CH_3}{|}}{Si}}-O\right]_{16}-Si(OC_2H_5)_3$$

$$H-\left[\underset{\underset{CH_3}{|}}{\overset{\overset{CH_3}{|}}{Si}}-O\right]_{16}-SiCH_3(OC_2H_5)_2$$

$$H-\left[\underset{\underset{CH_3}{|}}{\overset{\overset{CH_3}{|}}{Si}}-O\right]_{16}-Si(CH_3)_2OC_2H_5$$

$$H-\left[\underset{\underset{CH_3}{|}}{\overset{\overset{CH_3}{|}}{Si}}-O\right]_{31}-Si(OCH_3)_3$$

$$H-\left[\underset{\underset{CH_3}{|}}{\overset{\overset{CH_3}{|}}{Si}}-O\right]_{31}-SiCH_3(OCH_3)_2$$

$$H-\left[\underset{\underset{CH_3}{|}}{\overset{\overset{CH_3}{|}}{Si}}-O\right]_{31}-Si(CH_3)_2OCH_3$$

$$H-\left[\underset{\underset{CH_3}{|}}{\overset{\overset{CH_3}{|}}{Si}}-O\right]_{31}-Si(OC_2H_5)_3$$

$$H-\left[\underset{\underset{CH_3}{|}}{\overset{\overset{CH_3}{|}}{Si}}-O\right]_{31}-SiCH_3(OC_2H_5)_2$$

$$H-\left[\underset{\underset{CH_3}{|}}{\overset{\overset{CH_3}{|}}{Si}}-O\right]_{31}-Si(CH_3)_2OC_2H_5$$

$$H-\left[\underset{\underset{CH_3}{|}}{\overset{\overset{CH_3}{|}}{Si}}-O\right]_{49}-Si(OCH_3)_3$$

$$H-\left[\underset{\underset{CH_3}{|}}{\overset{\overset{CH_3}{|}}{Si}}-O\right]_{49}-SiCH_3(OCH_3)_2$$

$$H-\left[\underset{\underset{CH_3}{|}}{\overset{\overset{CH_3}{|}}{Si}}-O\right]_{49}-Si(CH_3)_2OCH_3$$

$$H-\left[\underset{\underset{CH_3}{|}}{\overset{\overset{CH_3}{|}}{Si}}-O\right]_{49}-Si(OC_2H_5)_3$$

-continued $$H-\left[\underset{\underset{CH_3}{|}}{\overset{\overset{CH_3}{|}}{Si}}-O\right]_{49}-SiCH_3(OC_2H_5)_2$$

$$H-\left[\underset{\underset{CH_3}{|}}{\overset{\overset{CH_3}{|}}{Si}}-O\right]_{49}-Si(CH_3)_2OC_2H_5$$

$$H-\left[\underset{\underset{CH_3}{|}}{\overset{\overset{CH_3}{|}}{Si}}-O\right]_{100}-Si(OCH_3)_3$$

$$H-\left[\underset{\underset{CH_3}{|}}{\overset{\overset{CH_3}{|}}{Si}}-O\right]_{100}-SiCH_3(OCH_3)_2$$

$$H-\left[\underset{\underset{CH_3}{|}}{\overset{\overset{CH_3}{|}}{Si}}-O\right]_{100}-Si(CH_3)_2OCH_3$$

$$H-\left[\underset{\underset{CH_3}{|}}{\overset{\overset{CH_3}{|}}{Si}}-O\right]_{100}-Si(OC_2H_5)_3$$

$$H-\left[\underset{\underset{CH_3}{|}}{\overset{\overset{CH_3}{|}}{Si}}-O\right]_{100}-SiCH_3(OC_2H_5)_2$$

$$H-\left[\underset{\underset{CH_3}{|}}{\overset{\overset{CH_3}{|}}{Si}}-O\right]_{100}-Si(CH_3)_2OC_2H_5$$

$$H-\left[\underset{\underset{CH_3}{|}}{\overset{\overset{CH_3}{|}}{Si}}-O\right]_{500}-Si(OCH_3)_3$$

$$H-\left[\underset{\underset{CH_3}{|}}{\overset{\overset{CH_3}{|}}{Si}}-O\right]_{500}-SiCH_3(OCH_3)_2$$

$$H-\left[\underset{\underset{CH_3}{|}}{\overset{\overset{CH_3}{|}}{Si}}-O\right]_{500}-Si(CH_3)_2OCH_3$$

$$H-\left[\underset{\underset{CH_3}{|}}{\overset{\overset{CH_3}{|}}{Si}}-O\right]_{500}-Si(OC_2H_5)_3$$

$$H-\left[\underset{\underset{CH_3}{|}}{\overset{\overset{CH_3}{|}}{Si}}-O\right]_{500}-SiCH_3(OC_2H_5)_2$$

-continued
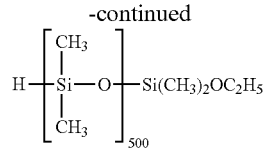
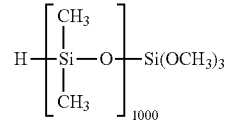
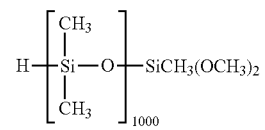
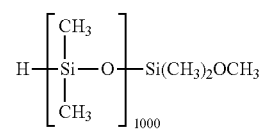
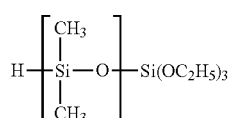
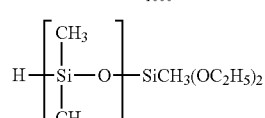
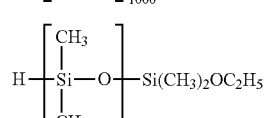
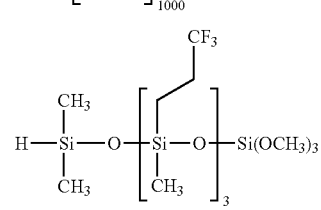
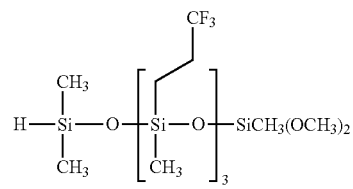
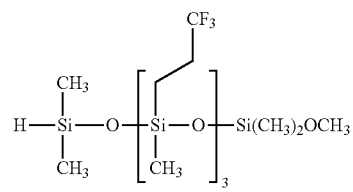
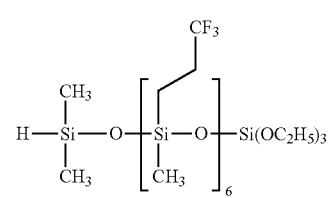
-continued
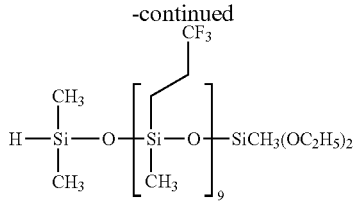
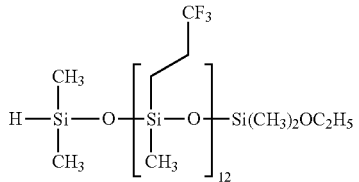
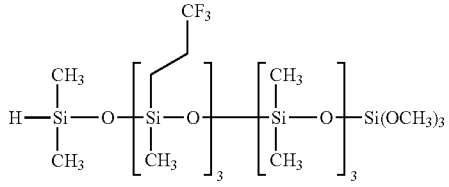
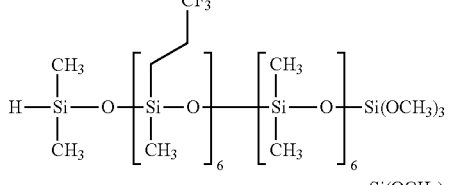
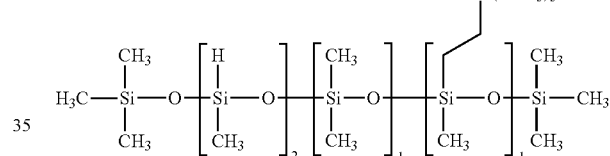
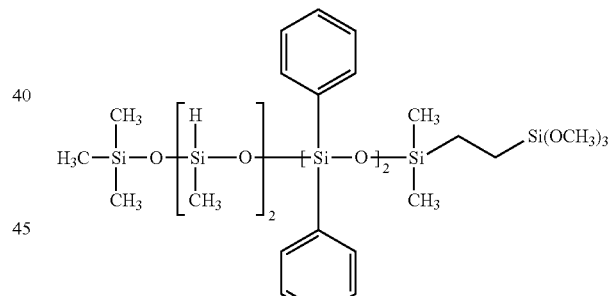
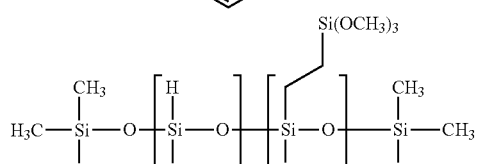
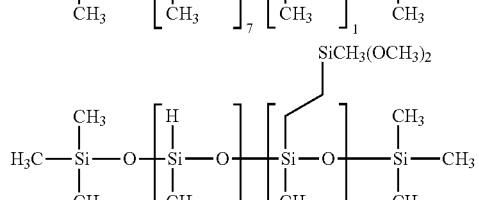
The platinum compound-containing catalyst to be used in the hydrosilylation described above is not particularly limited, and specific examples of the platinum compound-containing catalyst include chloroplatinic acid, an alcohol solution of chloroplatinic acid, a toluene or xylene solution of a platinum-1,3-divinyl-1,1,3,3-tetramethyldisiloxane complex, tetrakis triphenylphosphine platinum, dichlorobis triphenylphosphine platinum, dichlorobis acetonitrile platinum, dichlorobis benzonitrile platinum, dichloro cyclooctadiene platinum, and a supported catalyst such as platinum on carbon, platinum on alumina, or platinum on silica.

Among them, from the viewpoint of the selectivity, a zero-valent platinum complex is preferred, and a toluene or xylene solution of a platinum-1,3-divinyl-1,1,3,3-tetramethyldisiloxane complex is more preferred.

As the amount of the platinum compound-containing catalyst to be used, it is not particularly limited, however, from the viewpoints of the reactivity and the productivity, an amount with which the quantity of the platinum atoms to be included is $1 \times 10^{-7}$ to $1 \times 10^{-2}$ mol per mol of the amine compound having an alkenyl group of the formula (5) is preferred, and an amount with which the quantity of the platinum atoms to be included is $1 \times 10^{-7}$ to $1 \times 10^{-3}$ mol per mol of the amine compound having an alkenyl group of the formula (5) is more preferred.

Further, a co-catalyst may be used in order to improve the reactivity of hydrosilylation. As the co-catalyst, a co-catalyst that has been commonly used in hydrosilylation can be used, and in the present invention, an ammonium salt of inorganic acid, an acid amide compound, or a carboxylic acid is preferred.

Specific examples of the ammonium salt of inorganic acid include ammonium chloride, ammonium sulfate, ammonium amidosulfate, ammonium nitrate, monoammonium dihydrogen phosphate, diammonium hydrogen phosphate, triammonium phosphate, ammonium hypophosphite, ammonium carbonate, ammonium bicarbonate, ammonium sulfide, ammonium borate, and ammonium fluoroborate, and among them, an ammonium salt of an inorganic acid having a pKa of 2 or more is preferred, and ammonium carbonate, and ammonium bicarbonate are more preferred.

Specific examples of the acid amide compound include formamide, acetamide, N-methylacetamide, N,N-dimethylacetamide, propionamide, acrylamide, malonamide, succinamide, maleamide, fumaramide, benzamide, phthalamide, palmitic acid amide, stearic acid amide, and among them, formamide, and stearic acid amide are preferred, and formamide is more preferred.

Specific examples of the carboxylic acid include formic acid, acetic acid, propionic acid, butyric acid, methoxyacetic acid, pentanoic acid, caproic acid, heptanoic acid, octanoic acid, lactic acid, glycolic acid, trifluoroacetic acid, maleic acid, fumaric acid, succinic acid, tartaric acid, and oxalic acid, and among them, formic acid, acetic acid, lactic acid, maleic acid, fumaric acid, succinic acid, and trifluoroacetic acid are preferred, and acetic acid, trifluoroacetic acid are more preferred.

The amount of the co-catalyst to be used is not particularly limited, and from the viewpoint of the reactivity, the selectivity, the cost, or the like, the amount is preferably $1 \times 10^{-5}$ to $1 \times 10^{-1}$ mol, and more preferably $1 \times 10^{4}$ to $5 \times 10^{-1}$ mol, per mol of the amine compound having an alkenyl group of the formula (5).

In this regard, the above hydrosilylation reaction proceeds even without using any solvent, but a solvent can be used. Specific examples of the usable solvent include a hydrocarbon-based solvent such as pentane, hexane, cyclohexane, heptane, isooctane, benzene, toluene, and xylene; an ether-based solvent such as diethyl ether, tetrahydrofuran, and dioxane; an ester-based solvent such as ethyl acetate, and butyl acetate; an aprotic polar solvent such as N,N-dimethylformamide; and a chlorinated hydrocarbon-based solvent such as dichloromethane, and chloroform, and these solvents may be used singly alone, or by mixing two or more kinds thereof.

The reaction temperature in the above hydrosilylation reaction is not particularly limited, the hydrosilylation reaction can be performed under heating from 0° C., and the reaction temperature is preferably 0 to 200° C.

In order to obtain an adequate reaction rate, it is preferred to perform the reaction under heating, and from this point of view, the reaction temperature is more preferably 40 to 110° C., and furthermore preferably 40 to 90° C.

In addition, the reaction time is not particularly limited, and is usually around 1 to 60 hours, and the reaction time is preferably 1 to 30 hours, and more preferably 1 to 20 hours.

The reaction ratio of the alkenyl group of an amine compound (5) having the alkenyl group to the hydrosilyl group of a silane compound (6) having an organosiloxane structure is preferably 0.8 to 1.3 mol, and more preferably 0.9 to 1.2 mol, per mol of the hydrosilyl group, in view of the suppression of by-products during the hydrosilylation reaction and further of the enhancement of the storage stability and properties of the organic silicon compound to be obtained.

The light stabilizer according to the present invention contains at least one kind of the organic silicon compounds (hereinafter, referred to as organic silicon compounds (1)) having the average structural formula (1) described above.

The organic silicon compound (1) can be used alone as a light stabilizer, and can also be used as a composition in which an additive agent such as a stabilizer, and an optional component such as a solvent are appropriately mixed.

In this composition, the content of the organic silicon compound (1) is not particularly limited, and can be appropriately set to, for example, 90% by weight or more, 70% by weight or more, 50% by weight or more, 30% by weight or more, 10% by weight or more, 5% by weight or more, 1% by weight or more, or the like.

The curable composition, the coating agent composition, and the adhesive agent composition (hereinafter, may also be collectively referred to as composition) of the present invention each contain the organic silicon compound (1) according to the present invention.

The organic silicon compound (1) is derived from a structure of the organic silicon compound, and improves the weather resistance, crack resistance, and bleed resistance of a cured product to be obtained by using a composition containing the organic silicon compound (1), as compared with those of a conventional light stabilizer.

In the composition of the present invention, the content of an organic silicon compound is not particularly limited, and is preferably around 0.1 to 10% by weight, and more preferably 0.5 to 5% by weight in the composition. In this regard, in a case where the light stabilizer contains a solvent, the above content means a non-volatile content excluding the solvent.

The composition of the present invention is preferably a composition containing a resin as a main agent (base resin). As the resin, an organic resin or a silicone-based resin can be mentioned.

The organic resin is not particularly limited, and specific example of the organic resin include an epoxy resin, a phenol resin, polycarbonates, a polycarbonate blend, an acrylic resin, a urethane resin, a urethane acrylic resin, a polyester resin, a polyamide resin, a polyimide resin, polybutadiene, a styrene-butadiene copolymer, an acrylonitrile-styrene copolymer, a styrene-acrylonitrile-butadiene copolymer, a polyvinyl chloride resin, a polystyrene resin, a polyphenylene ether resin, a polymerizable reactive group-containing polyphenylene ether resin, a polystyrene and polyphenylene ether blend, cellulose acetate butyrate, and a polyethylene resin. The organic resin may be appropriately selected from the above depending on the application or the like.

In this case, the composition may be mixed with an appropriate curing agent depending on the organic resin to be used, and for example, in a case of using an epoxy resin, the composition may be mixed with a curing agent such as an imidazole compound.

Further, depending on the intended purpose for use, various kinds of additive agents such as a curing catalyst, an adhesiveness improving agent, an ultraviolet absorbing agent, a light stabilizer, a storage stability improving agent, a plasticizer, a filler, a pigment, and a solvent, may be added into the composition.

In addition, the composition of the present invention is preferably a composition containing a silicone-based resin as a main agent (base resin). As the silicone-based resin, it is not particularly limited, and a commercially available product may be used. Specific examples of the silicone-based resin include X-40-9250, X-40-9246, X-40-9225, KR-500, KR-515, KC-89S, KR-401N, X-40-9227, KR-510, KR-9218, KR-400, X-40-2327, and KR-401, which are manufactured by Shin-Etsu Chemical Co., Ltd.

Further, depending on the intended purpose for use, various kinds of additive agents such as a curing catalyst, an adhesiveness improving agent, an ultraviolet absorbing agent, a light stabilizer, a storage stability improving agent, a plasticizer, a filler, a pigment, and a solvent, may be added into the composition.

In a case of using the above-described silicone-based resin, the above curing catalyst is a component that promotes a reaction in which hydrolyzable groups contained in the silicone-based resin and the organic silicon compound according to the present invention are hydrolyzed and condensed with moisture in the air, or a dealcoholization reaction of a silicone-based resin and the organic silicon compound with a silanol group, and also promotes the curing of the composition, and is added to perform the curing efficiently.

The curing catalyst is not particularly limited as long as it is a curing catalyst to be used for curing a general moisture condensation curing-type composition. Specific examples of the curing catalyst include an alkyl tin compound such as dibutyltin oxide, and dioctyltin oxide; an alkyltin ester compound such as dibutyltin diacetate, dibutyltin dilaurate, dioctyltin dilaurate, dibutyltin dioctoate, dioctyltin dioctoate, and dioctyltin diversatate; a titanic acid ester such as tetraisopropoxy titanium, tetra n-butoxy titanium, tetra t-butoxy titanium, tetrakis(2-ethylhexoxy)titanium, dipropoxybis(acetylacetonato)titanium, titanium diisopropoxybis(ethylacetoacetate), and titanium isopropoxyoctylene glycol, and a titanium chelate compound, and a partial hydrolysate thereof; an organometallic compound such as zinc naphthenate, zinc stearate, zinc 2-ethyloctoate, iron 2-ethylhexoate, cobalt 2-ethylhexoate, manganese 2-ethylhexoate, cobalt naphthenate, aluminum trihydroxide, aluminum alcoholate, aluminum acylate, a salt of aluminum acylate, an aluminosiloxy compound, and an aluminum chelate compound; an aminoalkyl group-substituted alkoxysilane such as 3-aminopropyltrimethoxysilane, 3-aminopropyltriethoxysilane, 3-aminopropylmethyldimethoxysilane, 3-aminopropylmethyldiethoxysilane, N-β(aminoethyl) γ-aminopropyltrimethoxysilane, N-β(aminoethyl)γ-aminopropyltriethoxysilane, N-β(aminoethyl)γ-aminopropylmethyldimethoxysilane, N-β(aminoethyl)γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilylpropyl]ethane-1,2-diamine, and N-phenyl-3-aminopropyltrimethoxysilane; an amine compound such as hexylamine, dodecylamine phosphate, and tetramethyl guanidine, and a salt thereof; a quaternary ammonium salt such as benzyltriethylammonium acetate; a lower fatty acid salt of an alkali metal such as potassium acetate, sodium acetate, and lithium oxalate; a dialkylhydroxylamine such as dimethylhydroxylamine, and diethylhydroxylamine; guanidyl group-containing silane and siloxane such as tetramethyl guanidyl propyl trimethoxysilane, tetramethyl guanidyl propyl methyl dimethoxysilane, tetramethyl guanidyl propyl triethoxysilane, tetramethyl guanidyl propyl methyl diethoxysilane, and tetramethyl guanidyl propyl tris(trimethylsiloxy)silane; and phosphazene base-containing silane and siloxane such as N,N,N',N',N",N"-hexamethyl-N'"-[3-(trimethoxysilylpropyl]-phosphorimidic triamide. These may be used alone, or in combination of two or more kinds thereof.

Among them, from the viewpoint of being more excellent in the reactivity, dioctyltin dilaurate, dioctyltin diversatate, tetraisopropoxy titanium, tetra n-butoxy titanium, tetra t-butoxy titanium, titanium diisopropoxybis(ethylacetoacetate), 3-aminopropyltrimethoxysilane, N-β(aminoethyl)γ-aminopropyltrimethoxysilane, bis[3-(trimethoxysilyl)propyl]amine, N,N'-bis[3-(trimethoxysilyl)propyl]ethane-1,2-diamine, and tetramethyl guanidyl propyl trimethoxysilane are preferred, and from the viewpoint of the curability of the composition, tetraisopropoxy titanium, tetra n-butoxy titanium, tetra t-butoxy titanium, and titanium diisopropoxybis(ethylacetoacetate) are more preferred, and tetra n-butoxy titanium, and titanium diisopropoxybis(ethylacetoacetate) are furthermore preferred, and further from the viewpoint of the curability of the composition, tetra n-butoxy titanium is particularly preferred.

The amount of the curing catalyst to be added is not particularly limited, and is, in view of the improvement of the workability with the adjustment of the curing rate in an adequate range, preferably 0.01 to 15 parts by weight, and more preferably 0.1 to 5 parts by weight, per 100 parts by weight of the main agent (base resin) component.

The above-described coating composition of the present invention is applied onto a surface of a solid substrate, and cured to form a coating layer, and as a result of which a coated solid substrate is obtained, and the adhesive agent composition of the present invention is applied onto a surface of a solid substrate, and further on the applied solid substrate, another solid substrate is laminated, and then the composition is cured to form an adhesive layer, and as a result of which an adhesive laminate is obtained.

The method for applying each composition is not particularly limited, specific examples of the method include known methods such as spray coating, spin coating, dip coating, roller coating, brushing, bar coating, and flow coating, and the method may be appropriately selected from the known methods, and used.

The solid substrate is not particularly limited, and specific examples of the solid substrate include an organic resin substrate of an epoxy resin, a phenol resin, a polyimide resin, a polycarbonate resin such as polycarbonates and a polycarbonate blend, an acrylic resin such as poly(methyl methacrylate), a polyester resin such as poly(ethylene terephthalate), poly(butylene terephthalate), and an unsaturated polyester resin, a polyamide resin, an acrylonitrile-styrene copolymer resin, a styrene-acrylonitrile-butadiene copolymer resin, a polyvinyl chloride resin, a polystyrene resin, a polystyrene and polyphenylene ether blend, cellulose acetate butyrate, a polyethylene resin or the like; a metal substrate of an iron plate, a copper plate, a steel sheet or the like; a surface applied with a coating material; glass; ceramic; concrete; a slate plate; textile; an inorganic filler of wood, a stone material, a roof tile, (hollow) silica, titania, zirconia, alumina or the like; and a glass fiber product including glass fiber, such as glass cloth, glass tape, glass mat, or glass paper. The material and shape of the substrate are not particularly limited.

By bringing the composition of the present invention into contact with moisture in the atmosphere, hydrolysis condensation reaction of a silicone-based resin and the organic silicon compound according to the present invention, or dealcoholization reaction of a silicone-based resin and the organic silicon compound with a silanol group proceeds. As an index of the moisture in the atmosphere, any humidity of 10 to 100% RH is accepted, and in general, as the humidity is higher, the hydrolysis proceeds more quickly, and therefore moisture may be added to the atmosphere if desired.

The curing reaction temperature and the time can be appropriately changed according to a factor such as the substrate to be used, the moisture concentration, the catalyst concentration, or the kind of the hydrolyzable group. In general, the curing reaction temperature is preferably ordinary temperature in the vicinity of 25° C. from the viewpoint of the workability or the like, however, in order to promote the curing reaction, the curing reaction temperature may be raised within the range not exceeding the heat resistant temperature of the substrate to be used to perform the curing. The curing reaction time is usually around 1 minute to 1 week from the viewpoint of the workability or the like.

The curing of the composition of the present invention proceeds favorably even at room temperature, and therefore, in particular, even in a case where room temperature curing is essential at a work site or the like, the stickiness (tack) on a surface of coating disappears within several minutes to several hours. The composition is excellent in the curability and the workability, and may be subjected to heat treatment within the range not exceeding the heat resistant temperature of the substrate.

EXAMPLES

Hereinafter, the present invention is further described in more detail by way of Examples and Comparative Examples, but should not be limited at all by these Examples.

In this regard, in the following, the viscosity of each product is a value measured at 25° C. with an Ostwald viscometer, and the molecular weight is a weight average molecular weight in terms of polystyrene determined by gel permeation chromatography (GPC) measurement. In addition, the silicone average composition of each product was calculated from the integral values of detection spectra in $^1$H-NMR and $^{29}$Si-NMR by using a 300 MHz-NMR measurement device manufactured by JEOL Ltd.

[1] Synthesis of Organic Silicon Compound

Example 1-1

Synthesis of Organic Silicon Compound 1

Into a 300 mL separable flask equipped with a stirrer, a reflux condenser, a dropping funnel and a thermometer, 65.0 g of an amine compound having an alkenyl group of the following formula (7), and 0.58 g of a toluene solution of a platinum-1,3-divinyl-1,1,3,3-tetramethyldisiloxane complex ($5.0 \times 10^{-5}$ mol of platinum atom per mol of an amine compound having an alkenyl group) were placed, and the mixture in the flask was heated to 80° C. Into the heated mixture, 83.8 g of a silane compound having an organosiloxane structure of the following formula (8) was added dropwise, and the resultant mixture was heated and stirred at 80° C. for 2 hours. The peaks derived from the alkenyl group and hydrosilyl group of the raw material were confirmed to be completely disappeared by $^1$H-NMR measurement, and then the reaction was terminated. The mixture after the termination of the reaction was distilled off under reduced pressure (80° C., 5 mmHg) for 1 hour, and the resultant mixture was filtered to obtain 148 g of the corresponding organic silicon compound 1.

The obtained organic silicon compound 1 was a pale yellow transparent liquid having a viscosity of 13 mm$^2$/s and a weight average molecular weight of 480, and was a compound having the following formula (9).

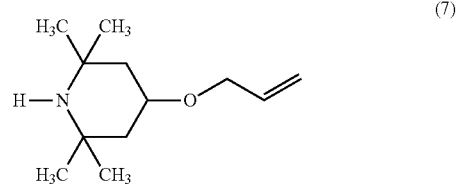

(7)

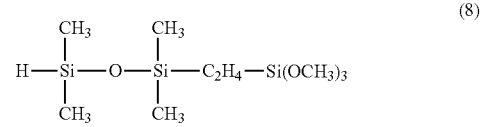

(8)

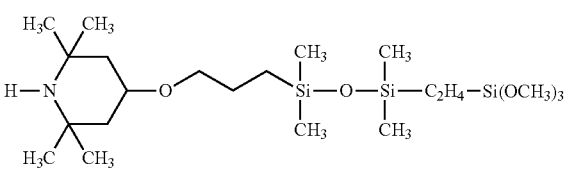

(9)

Example 1-2

Synthesis of Organic Silicon Compound 2

Into a 300 mL separable flask equipped with a stirrer, a reflux condenser, a dropping funnel and a thermometer, 69.6 g of an amine compound having an alkenyl group of the following formula (10), and 0.58 g of a toluene solution of a platinum-1,3-divinyl-1,1,3,3-tetramethyldisiloxane complex ($5.0 \times 10^{-5}$ mol of platinum atom per mol of an amine compound having an alkenyl group) were placed, and the mixture in the flask was heated to 80° C. Into the heated mixture, 83.8 g of a silane compound having an organosiloxane structure of the above formula (8) was added dropwise, and the resultant mixture was heated and stirred at 80° C. for 2 hours. The peaks derived from the alkenyl group and hydrosilyl group of the raw material were confirmed to be completely disappeared by $^1$H-NMR measurement, and then the reaction was terminated. The mixture after the termination of the reaction was distilled off under reduced pressure (80° C., 5 mmHg) for 1 hour, and the resultant mixture was filtered to obtain 152 g of the corresponding organic silicon compound 2.

The obtained organic silicon compound 2 was a yellow transparent liquid having a viscosity of 15 mm$^2$/s and a weight average molecular weight of 490, and was a compound having the following formula (11).

changed to 69.3 g of an amine compound having an alkenyl group of the following formula (14), and 151 g of the corresponding organic silicon compound 4 was obtained.

The obtained organic silicon compound 4 was a brown transparent liquid having a viscosity of 25 mm$^2$/s and a weight average molecular weight of 490, and was a compound having the following formula (15).

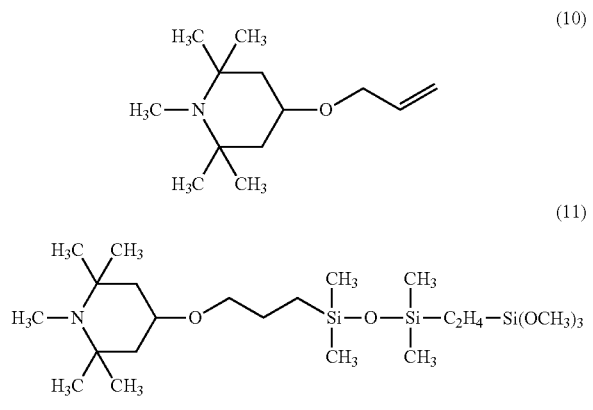

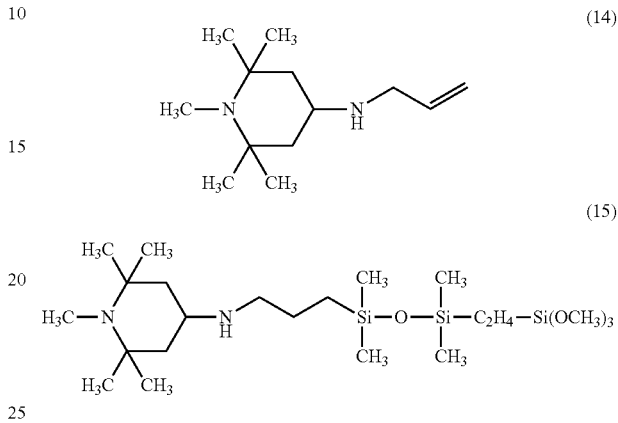

Example 1-3

Synthesis of Organic Silicon Compound 3

Synthesis was performed by a similar procedure as in Example 1-1 except that the 65.0 g of an amine compound having an alkenyl group of the above formula (7) was changed to 74.9 g of an amine compound having an alkenyl group of the following formula (12), and 156 g of the corresponding organic silicon compound 3 was obtained.

The obtained organic silicon compound 3 was a yellow transparent liquid having a viscosity of 17 mm$^2$/s and a weight average molecular weight of 510, and was a compound having the following formula (13).

Example 1-5

Synthesis of Organic Silicon Compound 5

Synthesis was performed by a similar procedure as in Example 1-1 except that the 65.0 g of an amine compound having an alkenyl group of the above formula (7) was changed to 92.8 g of an amine compound having an alkenyl group of the following formula (16), and 175 g of the corresponding organic silicon compound 5 was obtained.

The obtained organic silicon compound 5 was a pale yellow transparent liquid having a viscosity of 20 mm$^2$/s and a weight average molecular weight of 560, and was a compound having the following formula (17).

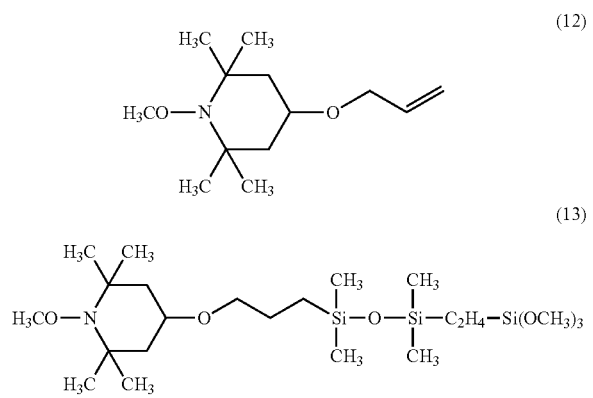

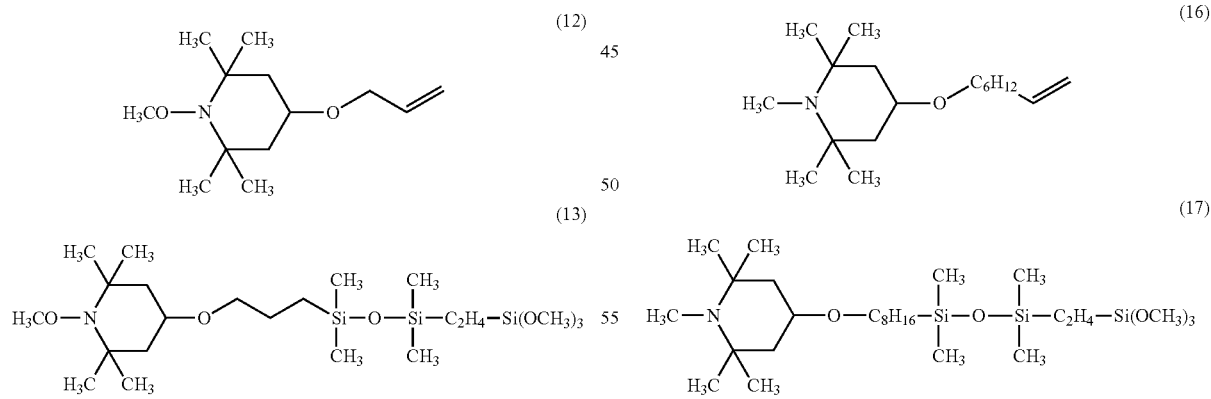

Example 1-4

Synthesis of Organic Silicon Compound 4

Synthesis was performed by a similar procedure as in Example 1-1 except that the 65.0 g of an amine compound having an alkenyl group of the above formula (7) was

Example 1-6

Synthesis of Organic Silicon Compound 6

Synthesis was performed by a similar procedure as in Example 1-2 except that the 83.8 g of a silane compound having an organosiloxane structure of the above formula (8)

was changed to 108.8 g of a silane compound having an organosiloxane structure of the following formula (18), and 177 g of the corresponding organic silicon compound 6 was obtained.

The obtained organic silicon compound 6 was a pale yellow transparent liquid having a viscosity of 18 mm²/s and a weight average molecular weight of 580, and was a compound having the following formula (19).

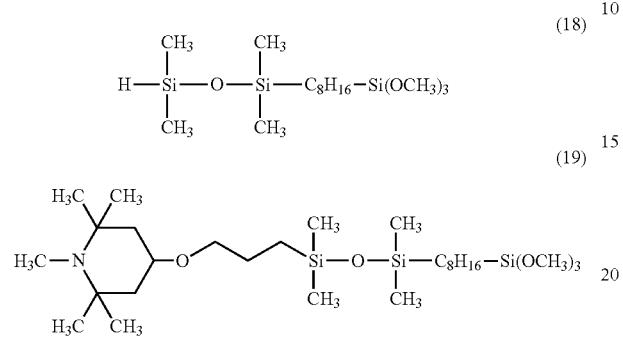

Example 1-7

Synthesis of Organic Silicon Compound 7

Synthesis was performed by a similar procedure as in Example 1-2 except that the 83.8 g of a silane compound having an organosiloxane structure of the above formula (8) was changed to 96.3 g of a silane compound having an organosiloxane structure of the following formula (20), and 164 g of the corresponding organic silicon compound 7 was obtained.

The obtained organic silicon compound 7 was a yellow transparent liquid having a viscosity of 16 mm²/s and a weight average molecular weight of 540, and was a compound having the following formula (21).

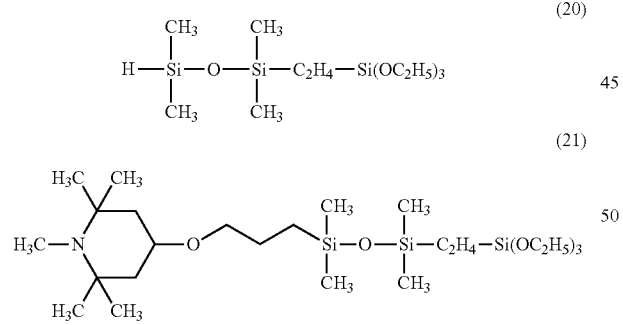

Example 1-8

Synthesis of Organic Silicon Compound 8

Synthesis was performed by a similar procedure as in Example 1-2 except that the 83.8 g of a silane compound having an organosiloxane structure of the above formula (8) was changed to 79.1 g of a silane compound having an organosiloxane structure of the following formula (22), and 147 g of the corresponding organic silicon compound 8 was obtained.

The obtained organic silicon compound 8 was a pale yellow transparent liquid having a viscosity of 13 mm²/s and a weight average molecular weight of 480, and was a compound having the following formula (23).

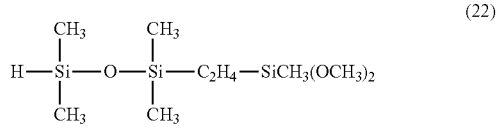

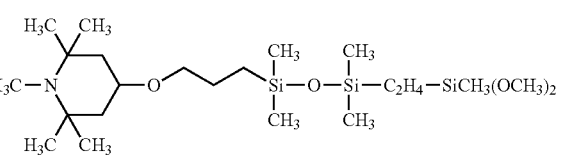

Example 1-9

Synthesis of Organic Silicon Compound 9

Synthesis was performed by a similar procedure as in Example 1-2 except that the 83.8 g of a silane compound having an organosiloxane structure of the above formula (8) was changed to 124.2 g of a silane compound having an organopolysiloxane structure of the following average structural formula (24), and 192 g of the corresponding organic silicon compound 9 was obtained.

The obtained organic silicon compound 9 was a pale yellow transparent liquid having a viscosity of 24 mm²/s and a weight average molecular weight of 630, and was a compound having the following average structural formula (25).

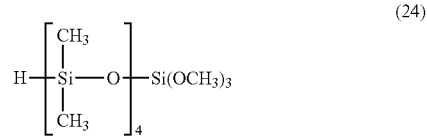

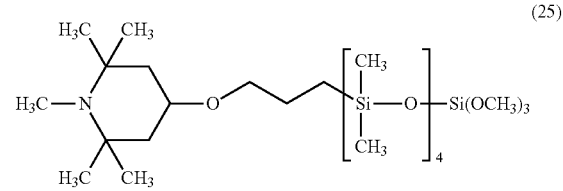

Example 1-10

Synthesis of Organic Silicon Compound 10

Synthesis was performed by a similar procedure as in Example 1-2 except that the 83.8 g of a silane compound having an organosiloxane structure of the above formula (8) was changed to 136.7 g of a silane compound having an organopolysiloxane structure of the following average structural formula (26), and 204 g of the corresponding organic silicon compound 10 was obtained.

The obtained organic silicon compound 10 was a yellow transparent liquid having a viscosity of 26 mm²/s and a weight average molecular weight of 670, and was a compound having the following average structural formula (27).

a weight average molecular weight of 850, and was a compound having the following average structural formula (31).

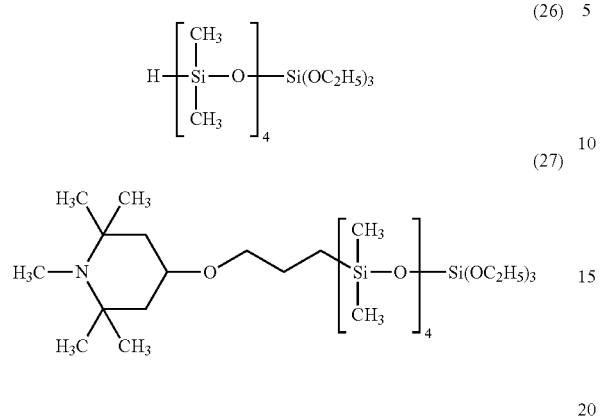

(26)

(27)

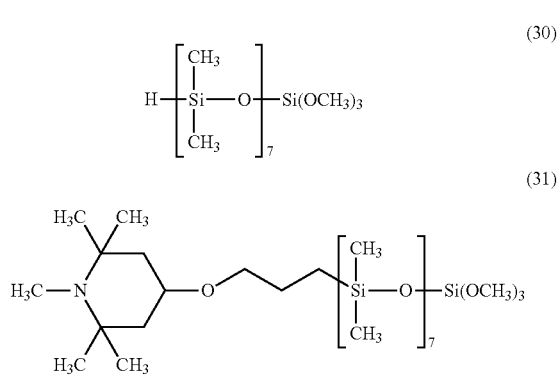

(30)

(31)

Example 1-11

Synthesis of Organic Silicon Compound 11

Synthesis was performed by a similar procedure as in Example 1-2 except that the 83.8 g of a silane compound having an organosiloxane structure of the above formula (8) was changed to 119.5 g of a silane compound having an organopolysiloxane structure of the following average structural formula (28), and 187 g of the corresponding organic silicon compound 11 was obtained.

The obtained organic silicon compound 11 was a yellow transparent liquid having a viscosity of 21 mm$^2$/s and a weight average molecular weight of 610, and was a compound having the following average structural formula (29).

Example 1-13

Synthesis of Organic Silicon Compound 13

Synthesis was performed by a similar procedure as in Example 1-2 except that the 83.8 g of a silane compound having an organosiloxane structure of the above formula (8) was changed to 256.1 g of a silane compound having an organopolysiloxane structure of the following average structural formula (32), and the 300 mL separable flask was changed to a 500 mL separable flask, and 323 g of the corresponding organic silicon compound 13 was obtained.

The obtained organic silicon compound 13 was a pale yellow transparent liquid having a viscosity of 45 mm$^2$/s and a weight average molecular weight of 1,080, and was a compound having the following average structural formula (33).

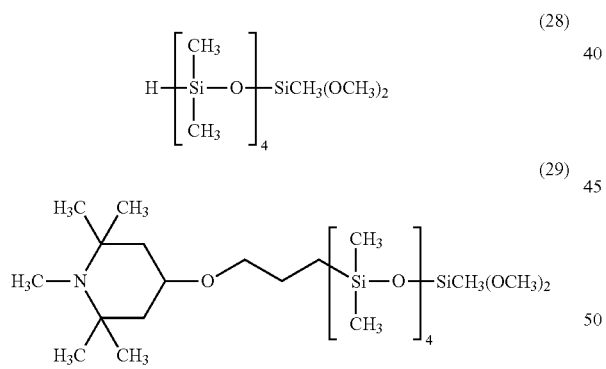

(28)

(29)

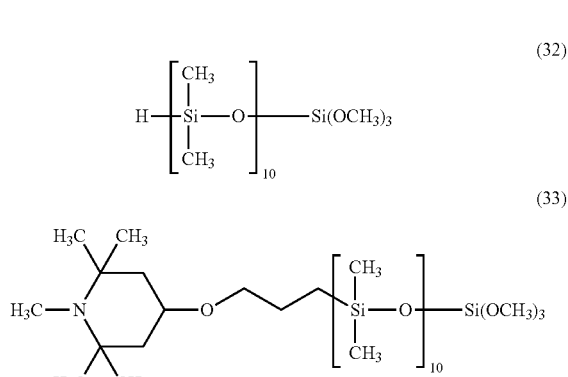

(32)

(33)

Example 1-12

Synthesis of Organic Silicon Compound 12

Synthesis was performed by a similar procedure as in Example 1-2 except that the 83.8 g of a silane compound having an organosiloxane structure of the above formula (8) was changed to 190.2 g of a silane compound having an organopolysiloxane structure of the following average structural formula (30), and 257 g of the corresponding organic silicon compound 12 was obtained.

The obtained organic silicon compound 12 was a pale yellow transparent liquid having a viscosity of 33 mm$^2$/s and Example 1-14

Synthesis of Organic Silicon Compound 14

Synthesis was performed by a similar procedure as in Example 1-2 except that the 83.8 g of a silane compound having an organosiloxane structure of the above formula (8) was changed to 717.9 g of a silane compound having an organopolysiloxane structure of the following average structural formula (34), and the 300 mL separable flask was changed to a 1 L separable flask, and 780 g of the corresponding organic silicon compound 14 was obtained.

The obtained organic silicon compound 14 was a pale yellow transparent liquid having a viscosity of 150 mm²/s and a weight average molecular weight of 2,630, and was a compound having the following average structural formula (35).

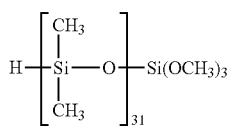

(34)

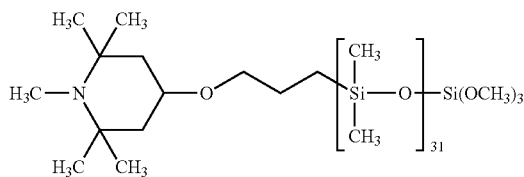

(35)

Example 1-15

Synthesis of Organic Silicon Compound 15

Synthesis was performed by a similar procedure as in Example 1-2 except that the 83.8 g of a silane compound having an organosiloxane structure of the above formula (8) was changed to 2,235.3 g of a silane compound having an organopolysiloxane structure of the following average structural formula (36), and the 300 mL separable flask was changed to a 3 L separable flask, and 2,282 g of the corresponding organic silicon compound 15 was obtained.

The obtained organic silicon compound 15 was a pale yellow transparent liquid having a viscosity of 360 mm²/s and a weight average molecular weight of 7,750, and was a compound having the following average structural formula (37).

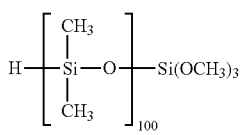

(36)

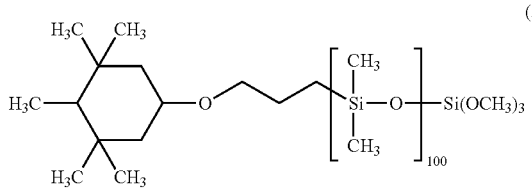

(37)

Example 1-16

Synthesis of Organic Silicon Compound 16

Synthesis was performed by a similar procedure as in Example 1-2 except that the 83.8 g of a silane compound having an organosiloxane structure of the above formula (8) was changed to 83.8 g of a silane compound having an organopolysiloxane structure of the following average structural formula (38), and 150 g of the corresponding organic silicon compound 16 was obtained.

The obtained organic silicon compound 16 was a pale yellow transparent liquid having a viscosity of 36 mm²/s and a weight average molecular weight of 990, and was a compound having the following average structural formula (39).

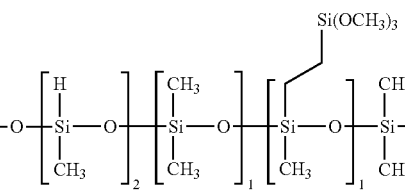

(38)

(in the formula, the arrangement order of the siloxane units is arbitrary.)

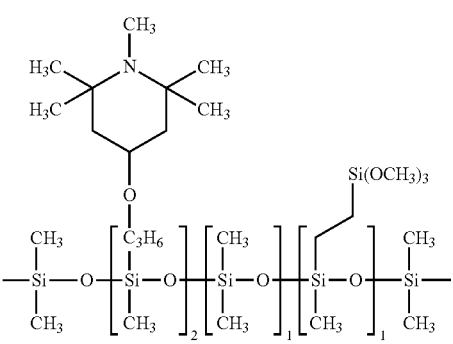

(39)

(in the formula, the arrangement order of the siloxane units is arbitrary.)

Example 1-17

Synthesis of Organic Silicon Compound 17

Synthesis was performed by a similar procedure as in Example 1-2 except that the 83.8 g of a silane compound having an organosiloxane structure of the above formula (8) was changed to 33.5 g of a silane compound having an organopolysiloxane structure of the following average structural formula (40), and 102 g of the corresponding organic silicon compound 17 was obtained.

The obtained organic silicon compound 17 was a pale yellow transparent liquid having a viscosity of 95 mm²/s and a weight average molecular weight of 2,270, and was a compound having the following average structural formula (41).

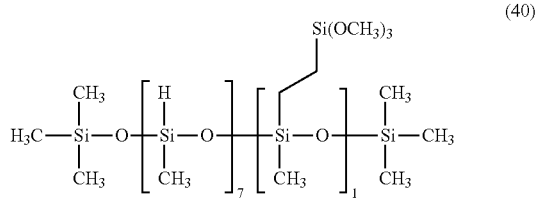

(40)

(in the formula, the arrangement order of the siloxane units is arbitrary.)

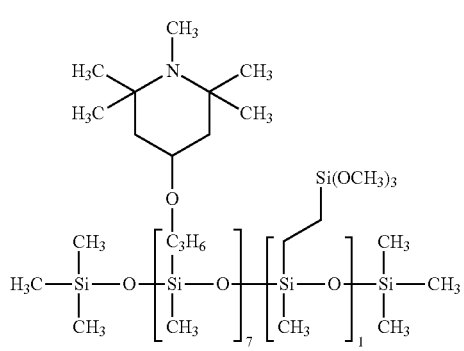

(41)

(in the formula, the arrangement order of the siloxane units is arbitrary.)

[2] Preparation of Composition for Coating and Cured Coating Film (Cured Article)

Example 2-1

100 parts by weight of a silicone-based resin (KR-500 manufactured by Shin-Etsu Chemical Co., Ltd.) as a main agent (base resin), 2 parts by weight of an organic silicon compound 1 obtained in Example 1-1 as a light stabilizer, and 2 parts by weight of tetra n-butoxy titanium as a curing catalyst were uniformly mixed by using a stirrer to prepare a composition for coating.

The obtained composition for coating was applied on a glass plate at 25° C. and 50% RH under the air by using a bar coater No. 14, and cured and dried at 25° C. and 50% RH for 1 week under the air to prepare a cured coating film.

Examples 2-2 to 2-17

A composition for coating and a cured coating film were prepared in a similar manner as in Example 2-1 except that the organic silicon compound 1 was changed to each of the organic silicon compounds 2 to 17 obtained in Examples 1-2 to 1-17, respectively.

Example 2-18

A composition for coating and a cured coating film were prepared in a similar manner as in Example 2-2 except that the silicone-based resin (KR-500 manufactured by Shin-Etsu Chemical Co., Ltd.) was changed to a silicone-based resin (KR-401 manufactured by Shin-Etsu Chemical Co., Ltd.), and the tetra n-butoxy titanium as a curing catalyst was not used.

Example 2-19

A composition for coating and a cured coating film were prepared in a similar manner as in Example 2-18 except that the organic silicon compound 2 was changed to an organic silicon compound 9 obtained in Example 1-9.

Comparative Examples 2-1 to 2-2

A composition for coating and a cured coating film were prepared in a similar manner as in Example 2-1 except that the organic silicon compound 1 was changed to a light stabilizer having the following formula (42) or (43).

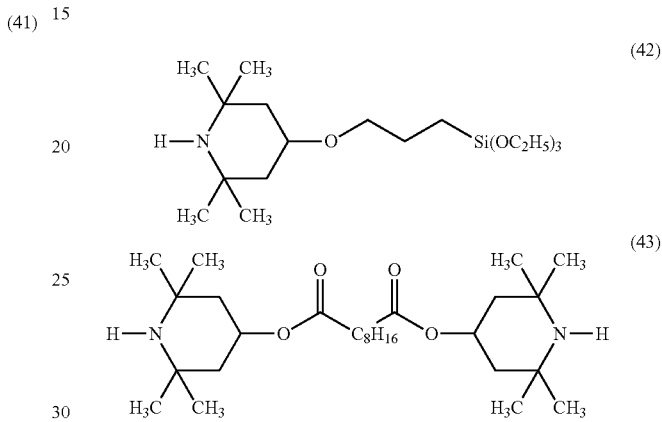

Comparative Example 2-3

A composition for coating and a cured coating film were prepared in a similar manner as in Example 2-1 except that the organic silicon compound 1 was not used.

Comparative Example 2-4

A composition for coating and a cured coating film were prepared in a similar manner as in Example 2-18 except that the organic silicon compound 2 was not used.

The following evaluation was performed on the cured coating films prepared in Examples 2-1 to 2-19 and Comparative Examples 2-1 to 2-4, respectively. The results are collectively shown in Tables 1 to 3.

Weather Resistance

A test piece obtained by forming a cured coating film on a glass plate by the above application method was subjected to UV irradiation (integrated irradiation dose: 26,000 mJ/cm$^3$) for 2 weeks by using a sterilization lamp under the air at 25° C. and 50% RH. The degree of yellowing of the cured coating film at that time was evaluated with ΔYI (yellowing degree=change width of yellowing degree YI) by using a colorimeter (Z-300A, manufactured by NIPPON DENSHOKU INDUSTRIES CO., LTD.) in accordance with JIS K 7373. It indicates that the smaller the value is, the better the weather resistance is.

Crack Resistance

A test piece obtained by forming a cured coating film on a glass plate by the above application method was subjected to UV irradiation (integrated irradiation dose: 26,000 mJ/cm³) for 2 weeks by using a sterilization lamp under the air at 25° C. and 50% RH. The presence or absence of cracks of the cured coating film at that time was observed with the naked eye.

In a case where no crack was observed at all, the crack resistance was evaluated as "○" that is excellent. In a case where one crack was observed, the crack resistance was evaluated as "Δ". In a case where two or more cracks were observed, the crack resistance was evaluated as "X".

Bleed Resistance

A test piece obtained by forming a cured coating film on a glass plate by the above application method was subjected to UV irradiation (integrated irradiation dose: 26,000 mJ/cm³) for 2 weeks by using a sterilization lamp under the air at 25° C. and 50% RH. The presence or absence of a bleed-out component on the cured coating film at that time was observed with the naked eye.

In a case where no bleed-out component was observed at all, the bleed resistance was evaluated as "○" that is excellent. In a case where a bleed-out component was observed, the bleed resistance was evaluated as "X".

the weather resistance, the crack resistance, and the bleed resistance as compared with those of a cured coating film prepared in each of Comparative Examples.

On the other hand, cured coating films prepared in Comparative Examples 2-1 to 2-4 had insufficient points in the weather resistance, the crack resistance, and the bleed resistance.

As described above, by using the organic silicon compound according to the present invention, a cured coating film excellent in the weather resistance, the crack resistance, and the bleed resistance, which has been difficult to obtain with a conventional light stabilizer, can be obtained.

Japanese Patent Application No. 2019-031644 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

TABLE 1

| | Example | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Organic silicon compound | 1 | 2 | 3 | 4 | 5 | 6 | 7 | 8 | 9 | 10 |
| Silicone-based resin | KR-500 | KR-500 | KR-500 | KR-500 | KR-500 | KR-500 | KR-500 | KR-500 | KR-500 | KR-500 |
| Weather resistance ΔYI | 0.2 | 0.2 | 0.2 | 0.4 | 0.3 | 0.4 | 0.2 | 0.2 | 0.2 | 0.4 |
| Crack resistance | O | O | O | O | O | O | O | O | O | O |
| Bleed resistance | O | O | O | O | O | O | O | O | O | O |

TABLE 2

| | Example | | | | | | | | |
|---|---|---|---|---|---|---|---|---|---|
| | 2-11 | 2-12 | 2-13 | 2-14 | 2-15 | 2-16 | 2-17 | 2-18 | 2-19 |
| Organic silicon compound | 11 | 12 | 13 | 14 | 15 | 16 | 17 | 2 | 9 |
| Silicone-based resin | KR-500 | KR-500 | KR-500 | KR-500 | KR-500 | KR-500 | KR-500 | KR-401 | KR-401 |
| Weather resistance ΔYI | 0.3 | 0.2 | 0.2 | 0.3 | 0.4 | 0.4 | 0.3 | 0.4 | 0.4 |
| Crack resistance | ○ | ○ | ○ | ○ | ○ | ○ | ○ | ○ | ○ |
| Bleed resistance | ○ | ○ | ○ | ○ | ○ | ○ | ○ | ○ | ○ |

TABLE 3

| | Comparative Example | | | |
|---|---|---|---|---|
| | 2-1 | 2-2 | 2-3 | 2-4 |
| Light stabilizer | Formula (42) | Formula (43) | — | — |
| Silicone-based resin | KR-500 | KR-500 | KR-500 | KR-401 |
| Weather resistance ΔYI | 1.0 | 1.2 | 1.6 | 2.6 |
| Crack resistance | Δ | Δ | X | X |
| Bleed resistance | ○ | X | ○ | ○ |

As shown in Tables 1 to 3, it can be understood that the cured coating films prepared in Examples 2-1 to 2-19 by using the organic silicon compounds 1 to 17 obtained in Examples 1-1 to 1-17 as light stabilizers were excellent in

The invention claimed is:

1. An organic silicon compound having an average structural formula (1):

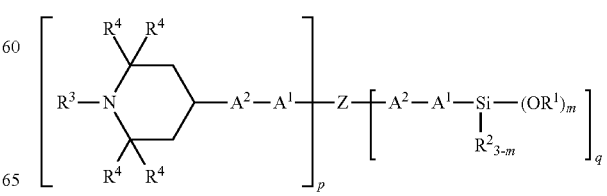

wherein Z represents a 2 to 20-valent group containing an organosiloxane structure, each $R^1$ independently represents an unsubstituted or substituted alkyl group having 1 to 10 carbon atoms, or an unsubstituted or substituted aryl group having 6 to 10 carbon atoms, each $R^2$ independently represents an unsubstituted or substituted alkyl group having 1 to 10 carbon atoms, or an unsubstituted or substituted aryl group having 6 to 10 carbon atoms, each $R^3$ independently represents a hydrogen atom, an unsubstituted or substituted alkyl group having 1 to 20 carbon atoms, an unsubstituted or substituted alkoxy group having 1 to 20 carbon atoms, or an O. (oxy radical), each $R^4$ independently represents a hydrogen atom, or an unsubstituted or substituted alkyl group having 1 to 10 carbon atoms, each $A^1$ independently represents a single bond, or an unsubstituted or substituted alkylene group having 1 to 20 carbon atoms, which is free of a hetero atom, each $A^2$ independently represents a single bond, or a divalent linking group containing a hetero atom, m is a number of 1 to 3, p is a number of 1 to 10, q is a number of 1 to 10, and p+q satisfies a number of 2 to 20 corresponding to the valency number of Z.

2. The organic silicon compound according to claim 1, having an average structural formula (2):

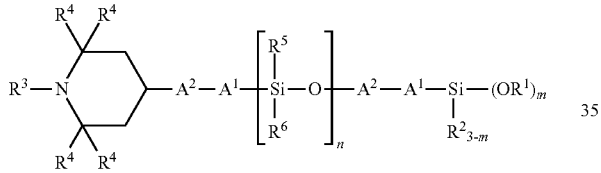

(2)

wherein $R^1$, $R^2$, $R^3$, $R^4$, $A^1$, $A^2$, and m have the same meanings as those described above, $R^5$ and $R^6$ each independently represent an unsubstituted or substituted alkyl group having 1 to 20 carbon atoms, or an aryl group having 6 to 10 carbon atoms, n represents a number of 1 or more.

3. The organic silicon compound according to claim 1, having a structural formula (3):

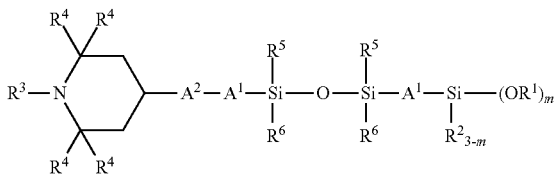

(3)

wherein $R^1$, $R^2$, $R^3$, $R^4$, $A^1$, $A^2$, and m have the same meanings as those described above, $R^5$ and $R^6$ each independently represent an unsubstituted or substituted alkyl group having 1 to 20 carbon atoms, or an aryl group having 6 to 10 carbon atoms.

4. The organic silicon compound according to claim 1, having an average structural formula (4):

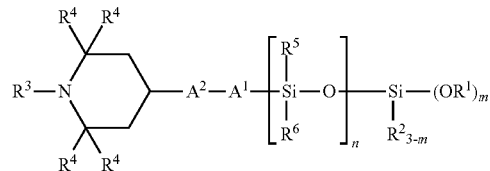

(4)

wherein $R^1$, $R^2$, $R^3$, $R^4$, $A^1$, $A^2$, and m have the same meanings as those described above, n represents a number of 1 or more, $R^5$ and $R^6$ each independently represent an unsubstituted or substituted alkyl group having 1 to 20 carbon atoms, or an aryl group having 6 to 10 carbon atoms.

5. A method for producing the organic silicon compound according to claim 1, comprising
performing hydrosilylation reaction of an amine compound having an alkenyl group of a structural formula (5):

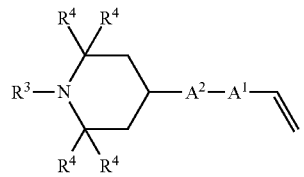

(5)

wherein $R^3$, $R^4$, $A^1$, $A^2$ have the same meanings as those described above,
with a silane compound having an organosiloxane structure of an average structural formula (6):

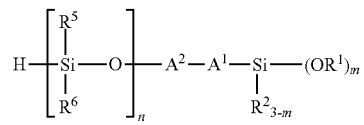

(6)

wherein $R^1$, $R^2$, $A^1$, $A^2$, and m have the same meanings as those described above, n represents a number of 1 or more, $R^5$ and $R^6$ each independently represent an unsubstituted or substituted alkyl group having 1 to 20 carbon atoms, or an aryl group having 6 to 10 carbon atoms,
in the presence of a platinum compound-containing, catalyst.

6. A light stabilizer, comprising the organic silicon compound according to claim 1.

7. A curable composition, comprising the organic silicon compound according to claim 1.

8. A coating agent, comprising the curable composition according to claim 7.

9. An adhesive agent, comprising the curable composition according to claim 7.

10. A cured article obtained by curing the curable composition according to claim 7.

11. A cured article, comprising a coating layer obtained by curing the coating agent according to claim 8.

12. A cured article, comprising an adhesive layer obtained by curing the adhesive agent according to claim 9.

* * * * *